US012575985B2

(12) United States Patent
O'Neal et al.

(10) Patent No.: US 12,575,985 B2
(45) Date of Patent: Mar. 17, 2026

(54) SIDERAIL ASSEMBLIES AND PERSON-SUPPORT APPARATUSES FOR ADJUSTABLE WIDTH SURFACE

(71) Applicant: Hill-Rom Services, Inc., Batesville, IN (US)

(72) Inventors: Todd O'Neal, Batesville, IN (US); Travis A. Pelo, Batesville, IN (US); Robert Mark Zerhusen, Batesville, IN (US); Nicholas Mann, Batesville, IN (US); Neal Wiggermann, Batesville, IN (US); David C. Newkirk, Batesville, IN (US); Jack B. Sing, Batesville, IN (US)

(73) Assignee: Hill-Rom Services, Inc., Batesville, IN (US)

( * ) Notice: Subject to any disclaimer, the term of this patent is extended or adjusted under 35 U.S.C. 154(b) by 35 days.

(21) Appl. No.: 18/667,423

(22) Filed: May 17, 2024

(65) Prior Publication Data

US 2024/0390202 A1 Nov. 28, 2024

Related U.S. Application Data

(60) Provisional application No. 63/503,804, filed on May 23, 2023.

(51) Int. Cl.
*A61G 7/05* (2006.01)

(52) U.S. Cl.
CPC .......... *A61G 7/0516* (2016.11); *A61G 7/0519* (2016.11)

(58) Field of Classification Search
CPC ................ A61G 7/0507; A61G 7/0514; A61G 2200/16; A61G 7/051; A61G 7/0509
See application file for complete search history.

(56) References Cited

U.S. PATENT DOCUMENTS 4,409,695 A * 10/1983 Johnston ................ A61G 7/052 5/616
4,669,136 A * 6/1987 Waters ................ A61G 7/0519 177/144

(Continued)

FOREIGN PATENT DOCUMENTS

CN 102846442 B 4/2014
CN 211658639 U 10/2020

(Continued)

*Primary Examiner* — Sarah B McPartlin
(74) *Attorney, Agent, or Firm* — Dinsmore & Shohl LLP

(57) ABSTRACT

Embodiments disclosed include a person-support apparatus, which includes a mattress, a person-support apparatus frame, and a siderail. The siderail assembly may be pivotally coupled to the person-support apparatus frame. The siderail assembly includes a siderail, a drop surface, and a siderail adjustment mechanism. The drop surface is configured to be raised and lowered relative to a deck section of a person-support apparatus so as to widen or narrow the width of the deck section. The siderail adjustment mechanism has a rail end and a frame end. The drop surface is removably attached to the siderail. The rail end of the siderail adjustment mechanism is pivotally coupled to the siderail. The frame end of the siderail adjustment mechanism is pivotable relative to the person-support apparatus frame such that pivoting the siderail adjustment mechanism moves the siderail assembly between a raised position and a lowered position.

19 Claims, 12 Drawing Sheets

(56) References Cited

U.S. PATENT DOCUMENTS

| | | | | | |
|---|---|---|---|---|---|
| 4,985,946 | A | | 1/1991 | Foster et al. | |
| 5,345,629 | A | | 9/1994 | Ferrand | |
| 5,987,666 | A | * | 11/1999 | Zigmont | A47C 21/08 5/663 |
| 6,182,310 | B1 | | 2/2001 | Weismiller et al. | |
| 6,374,438 | B1 | * | 4/2002 | Fox | A61G 1/0287 5/617 |
| 6,499,167 | B1 | * | 12/2002 | Ellis | A61G 7/00 5/709 |
| 6,675,415 | B2 | | 1/2004 | Wong | |
| 6,734,438 | B1 | | 5/2004 | Lindsay et al. | |
| 6,928,673 | B2 | * | 8/2005 | Risk, Jr. | A61G 7/05 5/663 |
| 7,805,782 | B2 | * | 10/2010 | Hakamiun | A61G 7/0507 5/430 |
| 8,069,514 | B2 | | 12/2011 | Poulos et al. | |
| 9,622,927 | B1 | | 4/2017 | Edgerton | |
| 9,925,102 | B2 | | 3/2018 | Turner et al. | |
| 11,160,705 | B2 | * | 11/2021 | Tessmer | A61G 7/005 |

FOREIGN PATENT DOCUMENTS

| | | | | | |
|---|---|---|---|---|---|
| JP | 3173768 | B2 | | 6/2001 | |
| JP | 2004500192 | A | * | 4/2004 | A61G 13/10 |
| WO | 2017080534 | A1 | | 5/2017 | |

* cited by examiner

SIDERAIL ASSEMBLIES AND PERSON-SUPPORT APPARATUSES FOR ADJUSTABLE WIDTH SURFACE

CROSS-REFERENCE TO RELATED APPLICATION

The present application claims the priority benefit of U.S. Provisional Application Ser. No. 63/503,804, entitled "SIDERAIL ASSEMBLIES AND PERSON-SUPPORT APPARATUSES FOR ADJUSTABLE WIDTH SURFACE" and filed May 23, 2023, the entire contents of which are incorporated herein by reference.

TECHNICAL FIELD

The present disclosure relates to person-support apparatuses, and more particularly, to person-support apparatuses with moveable siderails.

BACKGROUND

A person-support apparatus with moveable siderails can be used to support and restrain subjects during procedures. The apparatus typically consists of a bed or table with siderails that can be moved or adjusted to accommodate subjects of different sizes and shapes. The siderails can also be adjusted to provide different levels of support and restraint, depending on the subject's needs. Therefore, a need exists for person-support apparatuses with moveable siderails to provide functions in different applications.

SUMMARY

In a first aspect, a siderail assembly includes a siderail, a drop surface, and a siderail adjustment mechanism having a rail end and a frame end. The drop surface is removably attached to the siderail, where the drop surface has a shape that is substantially complementary to a shape of a notch located at or near a center of a length of a mattress. The rail end is pivotally coupled to the siderail. The frame end is pivotable relative to a person-support apparatus frame such that pivoting the siderail adjustment mechanism upwardly or downwardly switches the siderail assembly between a raised position and a lowered position.

In a second aspect, a person-support apparatus includes a mattress, a person-support apparatus frame, a siderail assembly. The mattress includes a notch located at or near a center of a length of the mattress, wherein the notch includes a bottom. The person-support apparatus frame supports the mattress thereon. The siderail assembly is pivotally coupled to the person-support apparatus frame. The siderail assembly includes a siderail, a drop surface, and a siderail adjustment mechanism. The drop surface is removably attached to the siderail, where the drop surface has a shape that is substantially complementary to the shape of the notch. The siderail adjustment mechanism includes a rail end pivotally coupled to the siderail and a frame end pivotally coupled to the person-support apparatus frame such that pivoting the siderail adjustment mechanism upwardly or downwardly switches the siderail assembly between a raised position and a lowered position.

In a third aspect, a person-support apparatus includes a frame, a deck supported by the frame and configured to support a person lying on a mattress on the deck, a siderail positioned at the side of the deck, and a siderail adjustment mechanism configured to move the siderail upwardly and downwardly relative to the deck. The deck includes a drop section adjacent the siderail and configured to be raised or lowered relative to remainder of the deck, so as to widen or narrow a width of the deck, such that the remainder of the deck is configured to support the person and the drop section to no longer support the person.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
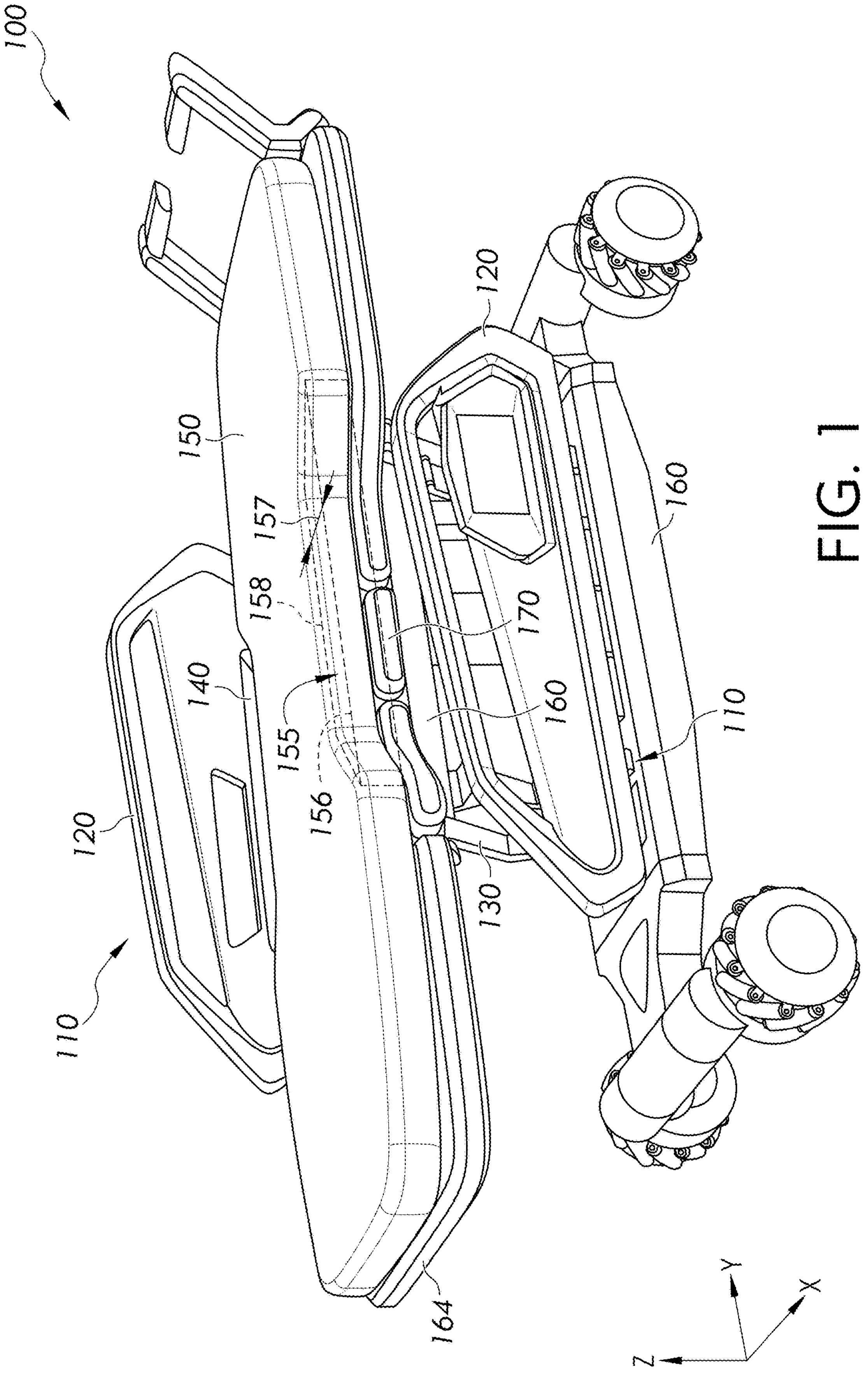
FIG. 1 schematically depicts a side perspective view of an example person-support apparatus having a siderail assembly on the left side and a siderail assembly on the right side, according to one or more embodiments shown and described herein.

The embodiments described herein are directed to person-support apparatuses and siderail assemblies for adjustable width surfaces. The person-support apparatus described herein includes a mattress, a person-support apparatus frame, and a siderail assembly. The mattress may include a notch located at or near a center of a length of the mattress. The person-support apparatus frame may support the mattress thereon. The siderail assembly may be pivotally coupled to the person-support apparatus frame through a pivot joint be beneath the mattress. The siderail assembly includes a siderail, a drop surface, and a siderail adjustment mechanism. The drop surface is configured to be raised and lowered relative to a deck section of a person-support apparatus so as to widen or narrow the width of the deck section. The siderail adjustment mechanism has a rail end and a frame end. The drop surface is removably attached to the siderail. The rail end of the siderail adjustment mechanism is pivotally coupled to the siderail. The frame end of the siderail adjustment mechanism is pivotable relative to a person-support apparatus frame such that pivoting the siderail adjustment mechanism moves the siderail assembly between a raised position and a lowered position. The siderail adjustment mechanism may be pivoted upwardly or downwardly at the frame end to move between a raised position and a lowered position. At the raised position, the drop surface may engage with the mattress and occupy the space of the notch and the siderail to protect a subject laying on the apparatus from failing. At the lowered position, the drop surface may either still engage with the mattress and occupy the space of the notch or deploy with the siderail to move underneath the mattress. When the drop surface moves with the siderail assembly to the lowered position, the width of the surface of the mattress around the center may be reduced by the depth of the notch.

Subject care transfer that involves moving a subject from one flat surface to another, such as from a bed to a stretcher and from a bed to a wheelchair. However, transferring a subject from one platform to another may cause issues, such as, for example increasing the risk of injuries to subjects and staff, adding unnecessary time or more steps to some processes, may require additional staff. In addition, moving subjects can be a physically demanding activity that certain staff members may not be able to complete. Thus, needs exist to reduce the number of steps, such as moving the subject from a mobile subject bed to a surgical bed. The subject may be at less risk of injury and staff efficiency may be improved to get subjects into the operating room sooner. Further, it helps to improve subject comfort.

However, a stretcher or other subject platform used for convalescing subjects is generally considered too wide to serve as an effective surgical platform because the surgeon lacks the ergonomic reach required for many surgical procedures. For example, a too-wide subject surface may cause a surgeon to stand or sit in a position that requires excessive bending or twisting. The embodiments disclosed herein are directed to person support apparatuses and siderail assemblies for adjusting the width of the subject platform during surgical use while also allowing adequate width for the convalescing subject. By using the person support apparatuses described herein, it is possible to support the subject on the person support apparatus for a wide variety of procedures, while also supporting the subject in a manner akin to a typical hospital bed without the need to transport the subject between different support apparatuses.

Various embodiments of the methods, systems, and devices of the wearable incontinence predictor are described in more detail herein. Whenever possible, the same reference numerals will be used throughout the drawings to refer to the same or like parts.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including matters of logic with respect to the arrangement of steps, operational flow, order of components, or orientation of components; plain meaning derived from grammatical organization or punctuation, and; the number or type of embodiments described in the specification.

As used herein, the singular forms “a,” “an” and “the” include plural referents unless the context clearly dictates otherwise. Thus, for example, reference to “a” component includes aspects having two or more such components unless the context clearly indicates otherwise.

Throughout the different embodiments, various perspective views of a person-support apparatus are provided. These include the front view, back view, top view, bottom view, left side view, and right side view. These perspectives are determined based on the Cartesian coordinate system, which has three perpendicular axes: the x-axis, y-axis, and z-axis. The origin, which is the point of intersection of all three axes, is located at the center of the person-support apparatus.

The x-axis is parallel to the floor and runs in the direction of the width of the person-support apparatus, while the y-axis is parallel to the floor and runs in the direction of the length of the person-support apparatus. The z-axis is perpendicular to the floor and runs in the direction of the height of the person-support apparatus.

To obtain the front view of the person-support apparatus, it is projected onto the z-x plane in the direction of the y-axis from the head end direction. The back view, on the other hand, is obtained by projecting it onto the z-x plane in the direction of the y-axis from the foot end direction. The top view is obtained by projecting the apparatus onto the x-y plane in the direction of the z-axis and looking at it from above, while the bottom view is obtained by projecting it onto the x-y plane in the direction of the z-axis and looking at it from below.

The side view of the person-support apparatus is obtained by projecting it onto the y-z plane in the direction of the x-axis and looking at it from either the left or right side of the person-support apparatus. The left and right sides of the person-support apparatus are defined as the left and right sides of a standing person when they look at the apparatus from the foot end.

Based on the perspective views described above, an object is raised in the z-axis away from the floor level and is lowered in the z-axis closer to the floor level. Object A is beneath Object B when Object A closer to the floor along the z-axis or the z-coordinate of Object A is less than the z-coordinate of Object B.

FIG. 1 generally depicts one embodiment of a person-support apparatus 100, such as a hospital bed, a subject care bed, or the like, with a siderail assembly 110 for an adjustable width surface. The person-support apparatus 100 generally includes a person-support apparatus frame 160, a mattress 150, and a siderail assembly 110. The siderail assembly 110 generally includes a siderail, a drop surface 140, and a siderail adjustment mechanism 130. The person-support apparatus 100 may further include a support deck 164 and a rail 170. The support deck 164 is mounted to the person-support apparatus frame 160 such that the support deck 164 can be raised, lowered, and/or tilted relative to the person-support apparatus frame 160 with a lift system. The person-support apparatus frame 160 admits elevation to the support deck 164, which further supports the mattress 150. A siderail assembly 110 on the left side and a siderail assembly 110 on the right side may be pivotally coupled to the person-support apparatus frame 160 under the support deck 164. In FIG. 1, the siderail assembly 110 on the left side is in a raised position and the siderail assembly 110 on the right side is in a lowered position. The siderail assembly 110 in the raised position has a siderail 120 positioned upward with the bottom higher than the support deck 164. The drop surface 140 is positioned at the same level as the mattress 150 (e.g., such that the drop surface 140 and the mattress 150 are coplanar). The siderail assembly 110 in the lowered position has a siderail 120 positioned upward with the top lower than the support deck 164. A notch 155 is located at or near the center of the length of the mattress. The notch 155 has a bottom 158, and defines a depth 157, a bottom length 159, and a width 156. A rail 170 is located on the support deck 164 at the bottom 158 of the notch 155. When the siderail assembly 110 is in a lowered position and the drop surface 140 moves with the siderail 120, the notch is in an open notch mode. In the open notch mode, the notch 155 operably accommodates a standing person to lean against the bottom 158 of the notch 155. Further, the siderail assembly 110 does not block the rail 170 and the rail 170 is in an operable status.

Figure 2A:
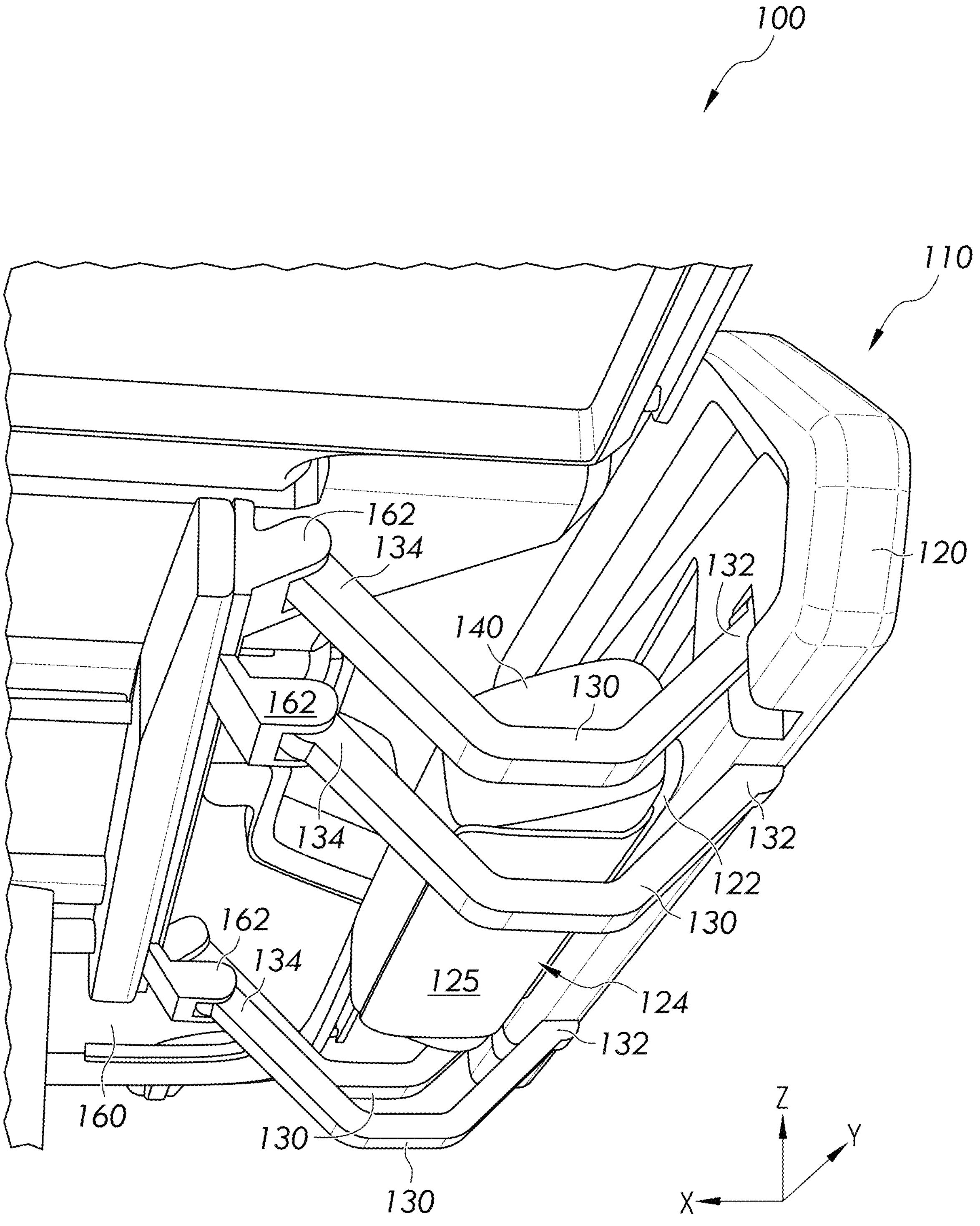
FIG. 2A schematically depicts a bottom perspective view of an example person-support apparatus having a siderail assembly on the right side, according to one or more embodiments shown and described herein.
Figure 2B:
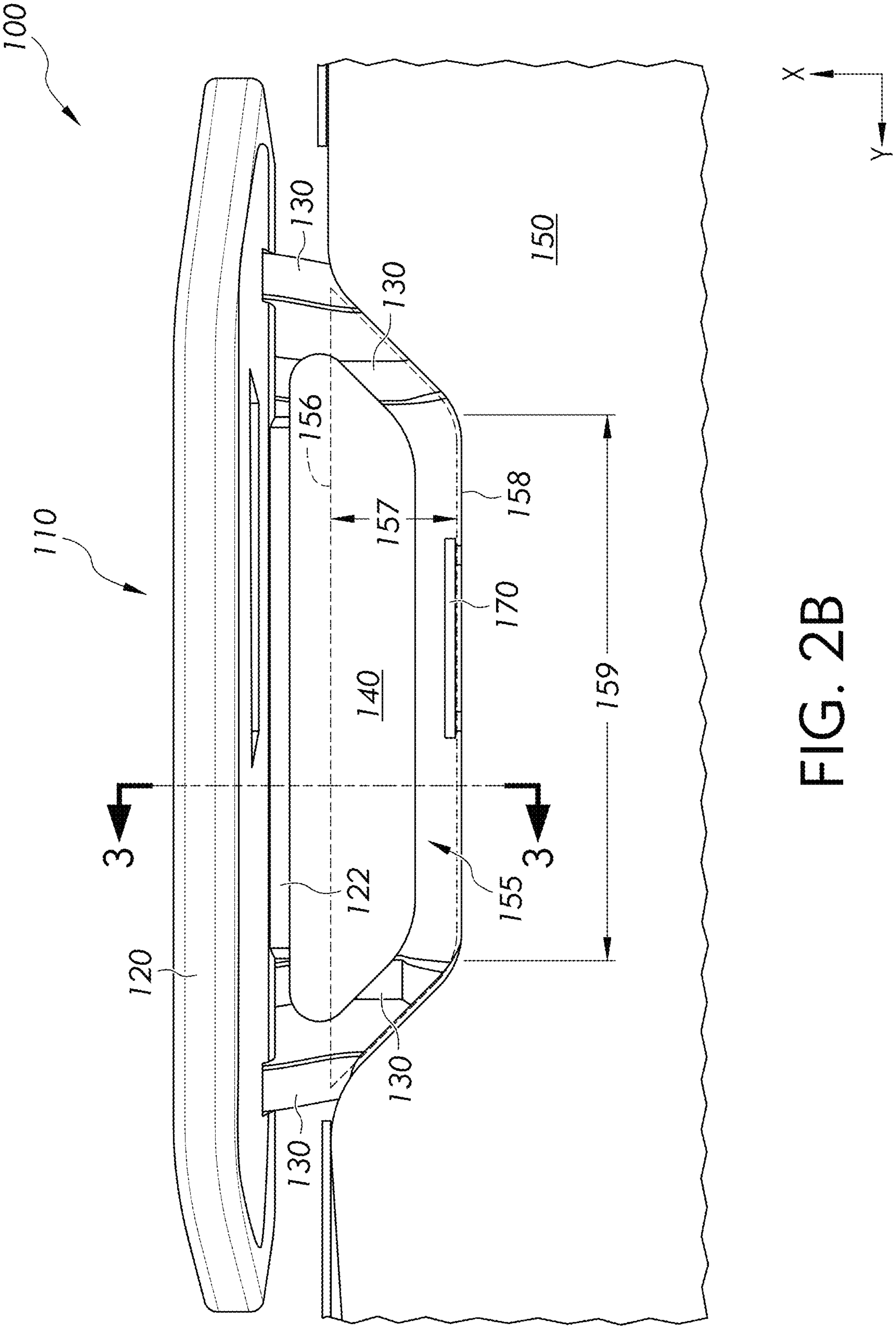
FIG. 2B schematically depicts a top view of an example person-support apparatus having a siderail assembly on the right side, according to one or more embodiments shown and described herein.

Referring to FIGS. 2A and 2B, example person-support apparatuses 100 with a siderail assembly 110 for adjustable width surface are depicted. FIGS. 2A and 2B schematically depict a bottom view and a top view of the person-support apparatus 100 having a siderail assembly 110 on the right side, respectively. The person-support apparatus 100 includes a mattress 150, a person-support apparatus frame 160, and a siderail assembly 110. The mattress 150 includes a notch 155 located at or near the center of the length of the mattress on the right side. The person-support apparatus frame 160 supports the mattress 150 thereon. The siderail assembly 110 includes a siderail 120, a drop surface 140, and a siderail adjustment mechanism 130. The siderail assembly 110 may be pivotally coupled to the person-support apparatus frame 160 through the siderail adjustment mechanism 130. The drop surface 140 may be removably attached to the siderail 120. As illustrated in FIGS. 2A and 2B, the siderail assembly 110 includes four siderail adjustment mechanisms 130. Each siderail adjustment mechanism 130 has a rail end 132 and a frame end 134. The rail end 132 may be pivotally coupled to the siderail 120 at the bottom of the siderail 120. The frame end 134 may be pivotally coupled to the person-support apparatus frame 160 at the pivot joint 162 of the person-support apparatus frame 160. The siderail assembly 110 may be pivoted upwardly to a raised position (e.g. as illustrated in the left siderail assembly 110 in FIG. 1) or downwardly in a lowered position (e.g. as illustrated in the right siderail assembly 110 in FIG. 1). Detail of the switching between the raised position and the lowered position is given further below.

As illustrated in FIG. 2B, the notch 155 has a bottom 158, and defines a depth 157, a bottom length 159, and a width 156. The notch 155 may have an arc shape, a trapezoidal shape, a rectangular shape, or other shapes. The notch 155 may be a V notch, a U notch, a trapezoidal notch, or a compound notch. The depth 157 of the notch 155 may be 2 cm, 4 cm, 6 cm, 8 cm, 10 cm, 12 cm, 14 cm, 16 cm, 18 cm, 20 cm, 22 cm, 24 cm, 26 cm, 28 cm, 30 cm, or any value or range between any two of these values (including endpoints). The bottom length 159 of the notch 155 may be 5 cm, 10 cm, 15 cm, 20 cm, 25 cm, 30 cm, 35 cm, 40 cm, 45 cm, 50 cm, 55 cm, 60 cm, 65 cm, 70 cm, 75 cm, 80 cm, 85 cm, 90 cm, 95 cm, 100 cm, or any value or range between any two of these values (including endpoints). The width 156 of the notch 155 may be 10 cm, 15 cm, 20 cm, 25 cm, 30 cm, 35 cm, 40 cm, 45 cm, 50 cm, 55 cm, 60 cm, 65 cm, 70 cm, 75 cm, 80 cm, 85 cm, 90 cm, 95 cm, 100 cm, 105 cm, 110 cm, 115 cm, 120 cm, 125 cm, 130 cm, 135 cm, 140 cm, 145 cm, 150 cm, or any value or range between any two of these values (including endpoints). The bottom 158 of the notch 155 is narrower than the width 156 of the notch 155. The bottom 158 may be wider than a buttock portion, a waist portion, and/or a thigh portion of a standing person when standing in a vicinity of the notch 155. The drop surface 140 may have an arc shape, a trapezoidal shape, a rectangular shape, or other shapes. The drop surface 140 may include one or more pads. Each pad may have an arc shape, a trapezoidal shape, a rectangular shape, or other shapes. The drop surface 140 may have a shape substantially complementary to the shape of the notch 155. For example, the height of the trapezoid is substantially similar to the depth 157 of the notch, the short base of the trapezoid is substantially similar to the bottom of the notch 155, and the long base of the trapezoid is substantially similar to the width of the notch 155 with a width. When the drop surface 140 engages with the mattress 150, a gap may be formed between the drop surface 140 and the mattress 150. The gap may be small enough to restrain any body parts, such as a finger or a toe, of a subject laying on the top from falling into the gap. The gap may be 0.1 cm, 0.2 cm, 0.3 cm, 0.4 cm, 0.5 cm, 0.6 cm, 0.7 cm, 0.8 cm, 0.9 cm, 1.0 cm, 1.2 cm, 1.4 cm, 1.6 cm, 1.8 cm, or 2.0 cm.

In embodiments, as illustrated in FIGS. 2A and 2B, the siderail assembly 110 may include an attachment 122 coupled to the inner side of the siderail 120 on one side and to the drop surface 140 on another side such that the drop surface 140 may be removably attached to the siderail 120.

Figure 3:
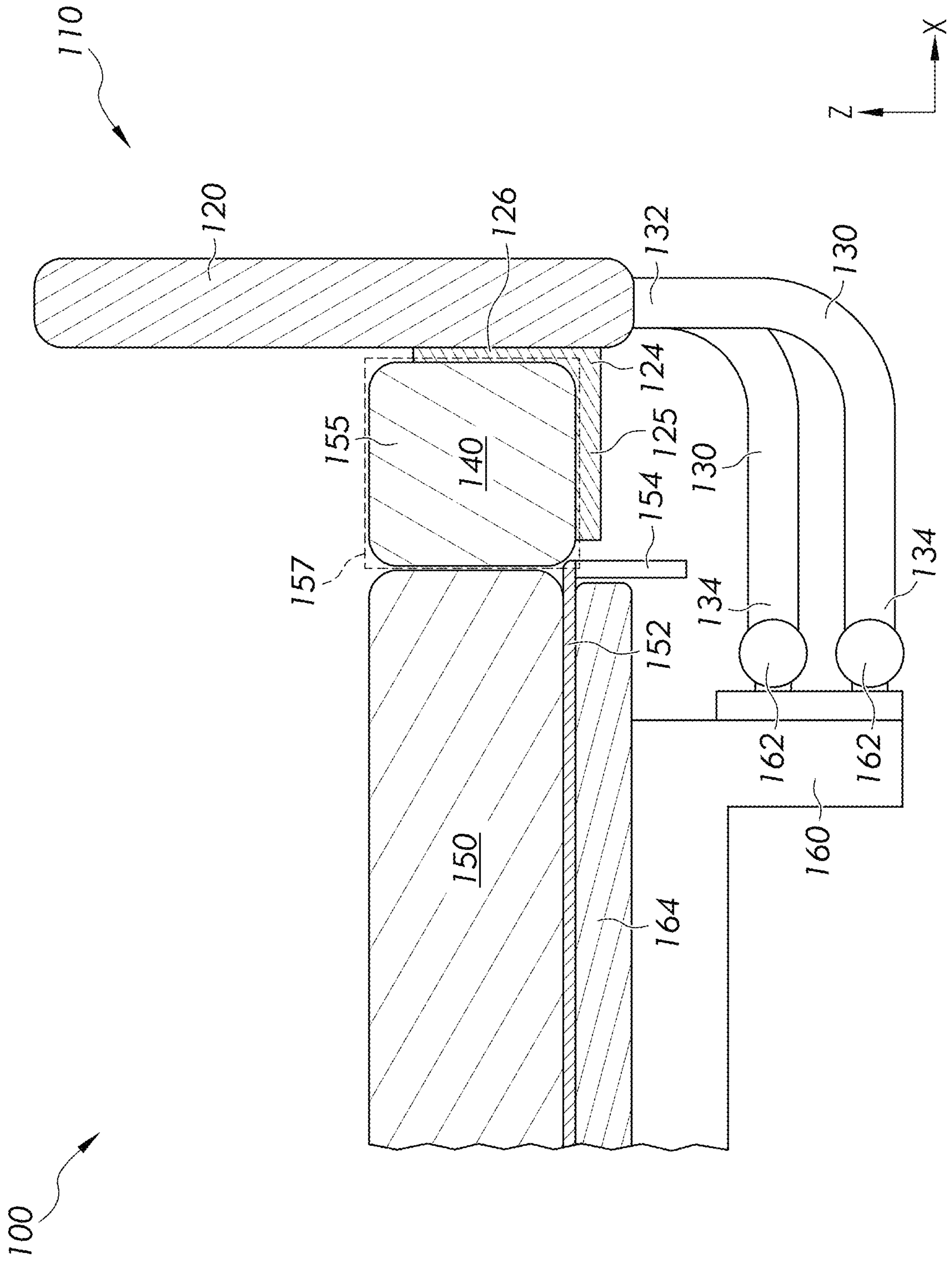
FIG. 3 schematically depicts a back view of an example person-support apparatus having a siderail assembly on the right side in a closed notch mode when the siderail assembly is in a raised position, according to one or more embodiments shown and described herein.
Figure 5:
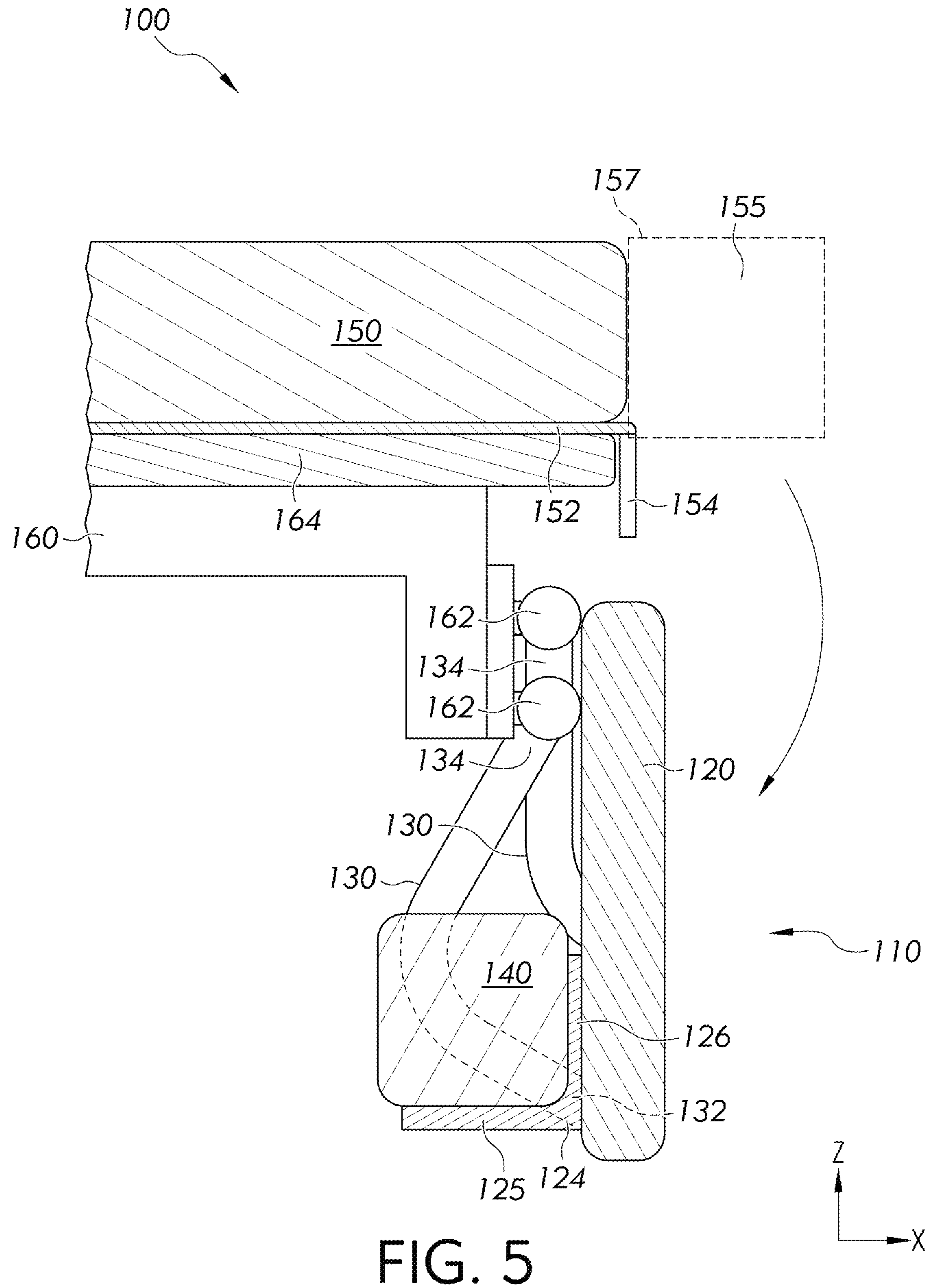
FIG. 5 schematically depicts a back view of an example person-support apparatus having a siderail assembly on the right side in an open notch mode, according to one or more embodiments shown and described herein.
Figure 7:
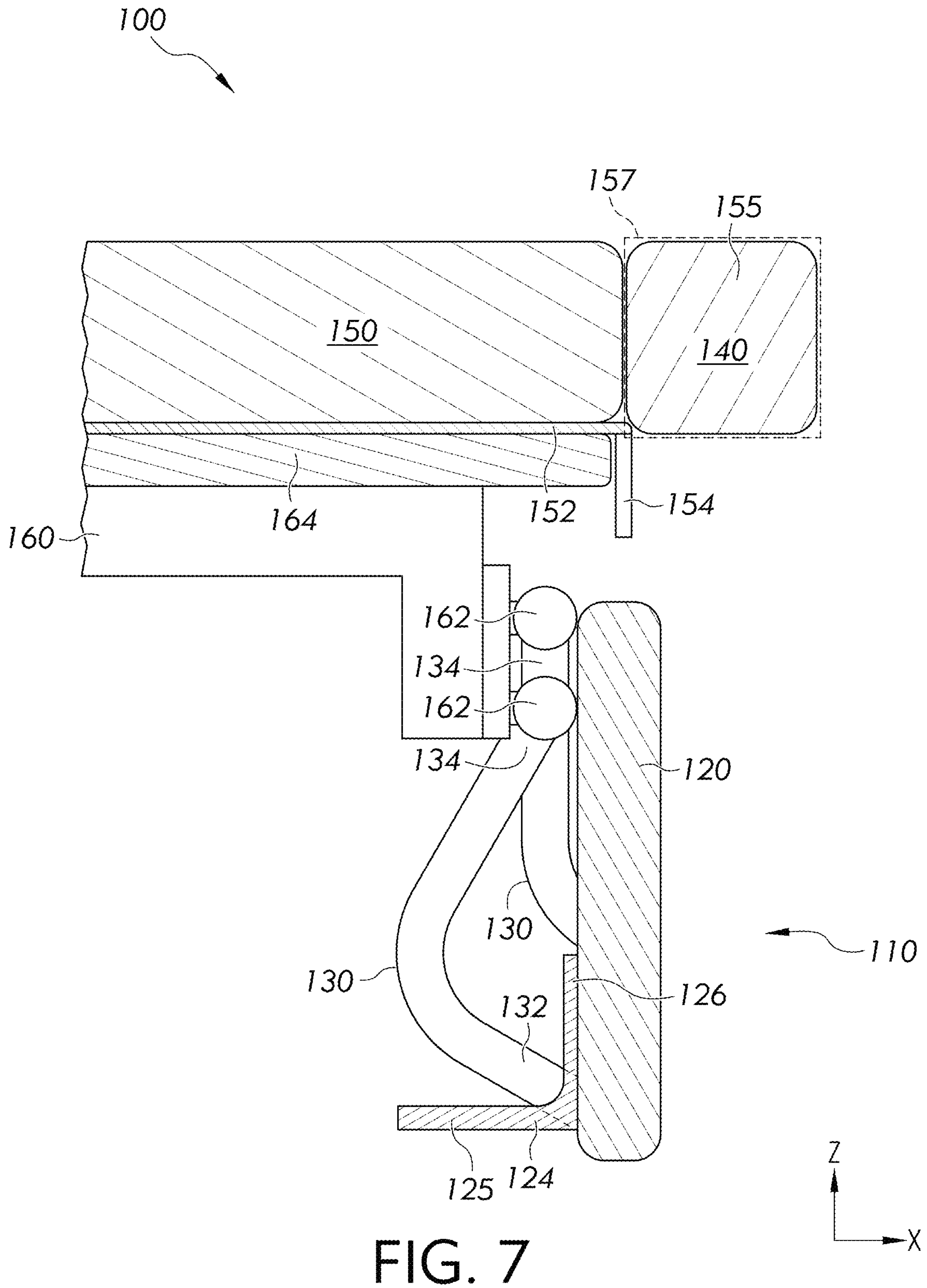
FIG. 7 schematically depicts a back view of an example person-support apparatus having a siderail assembly on the right side in a closed notch mode when the siderail assembly is in a lowered position, according to one or more embodiments shown and described herein.

The attachment 122 is a bolt, a clamp, or a bracket. In some embodiments, the siderail assembly 110 may further include a drop-surface support frame 124. The drop-surface support frame 124 includes a vertical plane 126 (e.g. as illustrated in FIGS. 3, 5, and 7) and a horizontal plane 125. The drop surface 140 may be removably attached to the horizontal plane 125 and be supported by the horizontal plane 125. The vertical plane 126 may be directly coupled to the inner side of the siderail 120 (e.g. as illustrated in FIGS. 3, 5, and 7) or coupled to the attachment 122 that is further coupled to the inner side of the siderail 120 (e.g. as illustrated in FIGS. 2A and 2B).

Referring to FIG. 3, a back view of an example person-support apparatus 100 having a siderail assembly 110 on the right side in a closed notch mode when the siderail assembly 110 is in a raised position. As illustrated in FIG. 3, the mattress 150 is supported by a support plate 152 with a support-plate handle 154. The support plate 152 is supported by a support deck 164, which is further supported on the person-support apparatus frame 160. Beneath the support deck 164 and on the upper right side of the person-support apparatus frame 160, two pivot joints 162 may be pivotally coupled to the two siderail assemblies 110 at the two frame ends 134. The pivot joints 162 may be slidably attached to a siderail track along a length direction of the person-support apparatus 100 such that when the pivot joints 162 are slid, the siderail assembly 110 may be adjusted to protect a subject laying on the apparatus from falling at a desired position on the left and/or right side of the mattress along the length direction. The siderail adjustment mechanisms 130 may be rotated upwardly to have the rail ends 132 at their highest position. The rail ends 132 are connected to the bottom of the siderail 120 and support the siderail 120 positioned upright. The person-support apparatus frame 160 may further include a locking mechanism to secure the siderail 120 in the upright position with the bottom of the siderail 120 at a level similar to that of the support deck 164. For example, the level (height from the floor) of the bottom of the siderail 120 is about 0.5 cm, 1 cm, 1.5 cm, or 2 cm above or below the level of the support deck 164. The upper portion of the siderail 120 extends upright with the top level higher than the mattress 150 more than an upright height. The upright height may be 10 cm, 12 cm, 14 cm, 16 cm, 18 cm, 20 cm, 22 cm, 24 cm, 26 cm, 28 cm, 30 cm, 32 cm, 34 cm, 36 cm, 38 cm, 40 cm, or any value or range between any two of these values (including endpoints). The inner side of the siderail 120 attaches the vertical plane 126 of the drop-surface support frame 124 such that the horizontal plane 125 of the drop-surface support frame 124 is at the level of the upper surface of the support deck 164. The drop surface 140 may be removably attached to the drop-surface support frame 124 on vertical plane 126 or horizontal plane 125 and may be supported by the drop-surface support frame 124. The upper surface of the drop surface 140 is at the same level as the mattress 150 and the drop surface 140 may connect the mattress 150 to form a shared planar surface. The top base of the drop surface 140 may be engaged with the mattress 150 at the bottom 158 (e.g. as illustrated in FIGS. 1 and 2B) of the notch 155. In the raised position of the siderail assembly 110, the space of the notch 155 is substantially filled with the drop surface 140 such that the drop surface 140 and the right edge of the mattress 150 are substantially complementary to each other. In FIG. 3, the notch is in a closed notch mode. There may be a gap between the edge of the mattress 150 and the drop surface 140. The gap may be small enough to avoid insertion of body parts of a subject laying upon, such as a finger or a toe, of the subject. The gap may be 0.1 cm, 0.2 cm, 0.3 cm, 0.4 cm, 0.5 cm, 0.6 cm, 0.7 cm, 0.8 cm, 0.9 cm, 1.0 cm, 1.2 cm, 1.4 cm, 1.6 cm, 1.8 cm, 2.0 cm, or any value or range between any two of these values (including endpoints).

Figure 4:
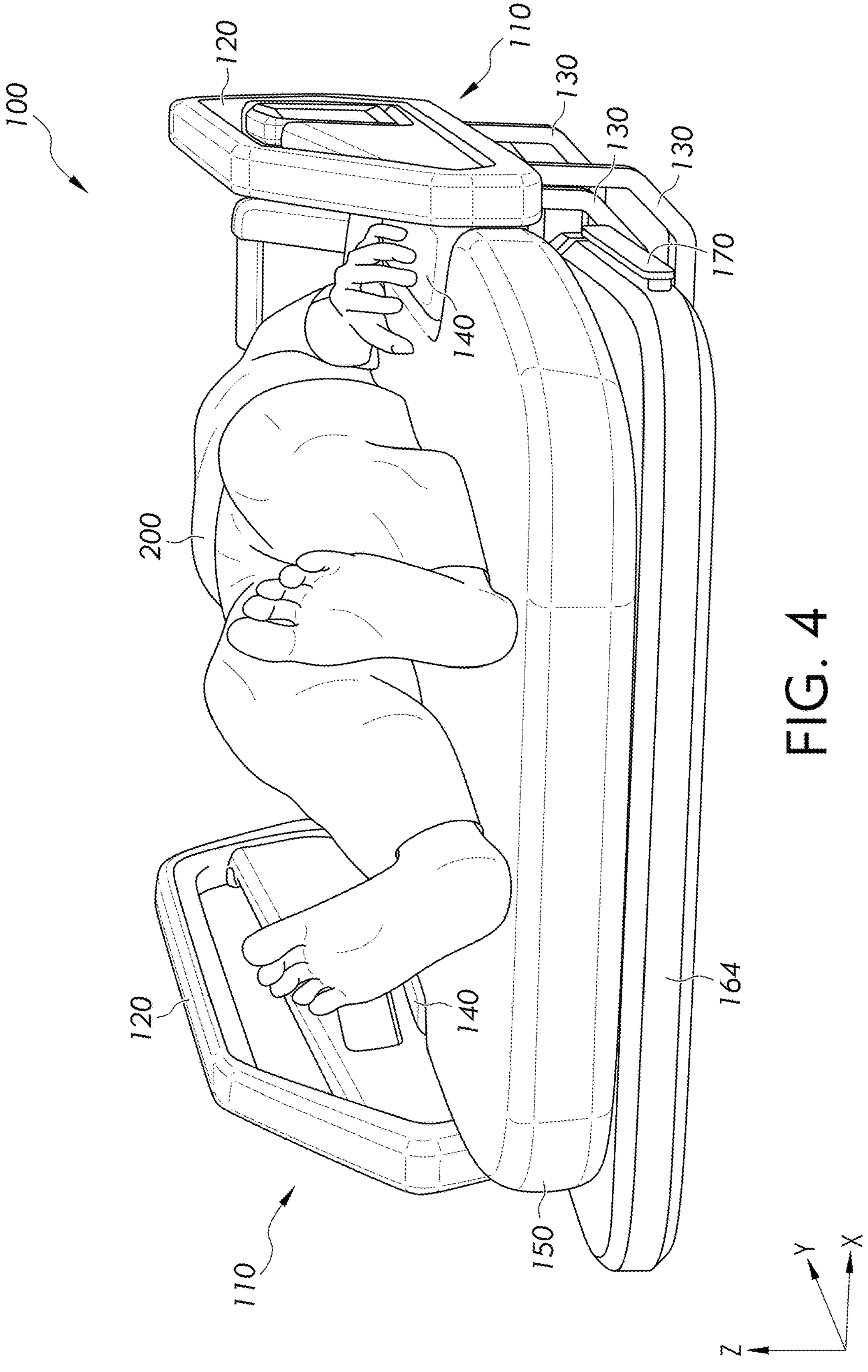
FIG. 4 schematically depicts a back perspective view of a subject laying on an example person-support apparatus having a siderail assembly on the left side and a siderail assembly on the right side in a closed notch mode when the siderail assembly is in a raised position, according to one or more embodiments shown and described herein.

Referring to FIG. 4, a back view of a subject 200 laying on an example person-support apparatus 100 having a siderail assembly 110 on the left side and a siderail assembly 110 on the right side in a closed notch mode when the siderail assemblies 110 are in a raised position. The siderails 120 on the left and right side of the person-support apparatus 100 may be positioned upright at a height greater than the mattress 150 top surface.

The partial weight of the subject 200 may be supported by the drop surface 140. For example, the subject 200 may rest a hand, an arm, a leg, a thigh, or any portion of the body on the drop surface 140. The gap between the edge of the mattress 150 and the drop surface 140 is small enough to avoid insertion of body parts of the subject 200 therein, such as a finger or a toe.

In the closed notch mode, the rail 170 may be blocked by the siderail assemble and is in an inoperable status. Conversely, as further illustrated below, in the open notch mode, the rail 170 may be in an operable status to accommodate surgical applications. For example, the rail 170 may be used to attach various surgical instruments, such as lights, cameras, and retractors. The rail 170 may provide a secure and stable platform for these instruments, allowing a surgeon to have both hands free to perform the procedure. The rail 170 may be made of metal and may be adjusted to the desired height and angle for desired access and visualization during the procedure.

Referring to FIG. 5, a back view of an example person-support apparatus 100 having a siderail assembly 110 on the right side in an open notch mode is schematically depicted. As illustrated in FIG. 5, the mattress 150 is supported by a support plate 152 with a support-plate handle 154. The support plate 152 may be removably engaged between the mattress and the support deck 164. The support plate 152 may include a plurality of support-plate handles 154 such that the support plate 152 with the mattress 150 thereon is operable to be lifted and removed from the person-support apparatus 100. The support plate 152 is supported by a support deck 164, which is further supported on the person-support apparatus frame 160. Beneath the support deck 164 and on the upper right side of the person-support apparatus frame 160, two pivot joints 162 may be pivotally coupled to the siderail assembly 110 at the two frame ends 134. The siderail adjustment mechanisms 130 are rotated downwardly for the rail ends 132 being at their lowest position. The pivot joints 162 may be slidably attached to a siderail track along a length direction of the person-support apparatus such that when the pivot joints 162 are slid, the siderail assembly 110 may be adjusted to move away from the space below the rail 170 (e.g. as illustrated in FIGS. 1 and 2B). The rail ends 132 pivotally connected to the bottom of the siderail 120. The siderail 120 may be rotated to an upright position with the bottom pivotally coupled to the rail end 132 and the upper portion engaged with frame ends 134 and the pivot joints 162. The person-support apparatus frame 160 may further include a locking mechanism to secure the siderail 120 in place such that the top of the siderail 120 is at a similar level as the pivot joints 162 and lower than the support deck 164. The locking mechanism may be a padlock, a deadbolt, or a lever lock. The inner side of the siderail 120 attaches the vertical plane 126 of the drop-surface support frame 124. The drop surface 140 may be removably attached to the drop-surface support frame 124 on the vertical plane 126 or horizontal plane 125 and may be supported by the drop-surface support frame 124. The upper surface of the drop surface 140 is below the level of the lower surface of the mattress 150 and support deck 164. The top base of the drop surface 140 is disengaged with the mattress 150. In some embodiments, the outer side of the siderail 120 may be in the same perpendicular plane as the edge of the mattress at the bottom 158 of the notch 155. In some other embodiments, the outer side of the siderail 120 may be in a retracted position that the outer side of the siderail 120 is closer to the center of the mattress 150 than the vertical plane of the edge of the mattress at the bottom 158 of the notch 155 is. In the lowered position of the siderail assembly 110, the space of the notch 155 is not filled with the drop surface 140. The notch is in an open notch mode. In the open notch mode, the notch 155 may operably accommodate a standing person to lean against the bottom of the notch. Further, a rail 170 may be in an operable status to be attached to other surgical instruments.

Figure 6A:
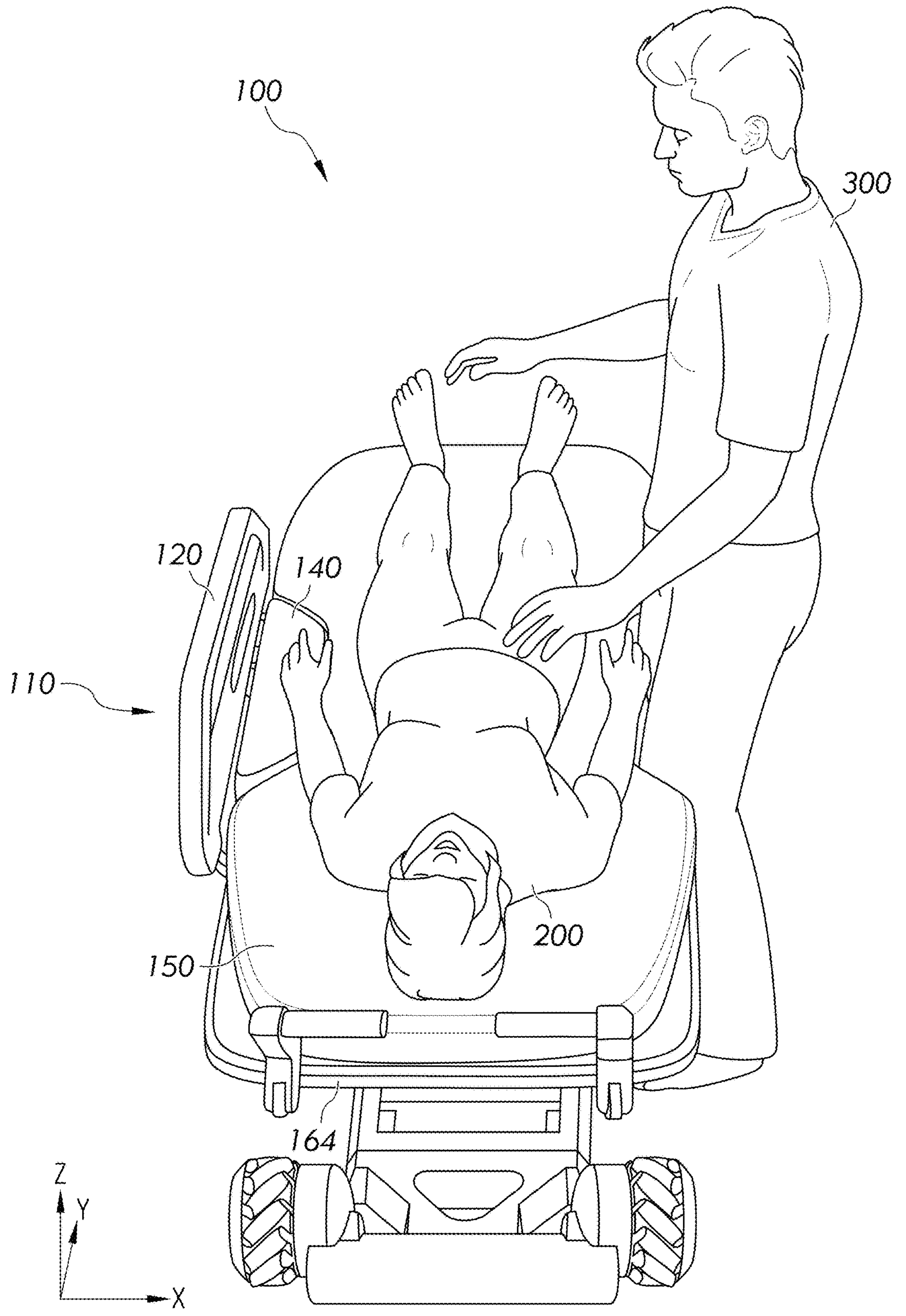
FIG. 6A schematically depicts a front perspective view of an example person-support apparatus having a siderail assembly in an open notch mode on the left side and another siderail assembly in a closed notch mode on the right side, according to one or more embodiments shown and described herein.
Figure 6B:
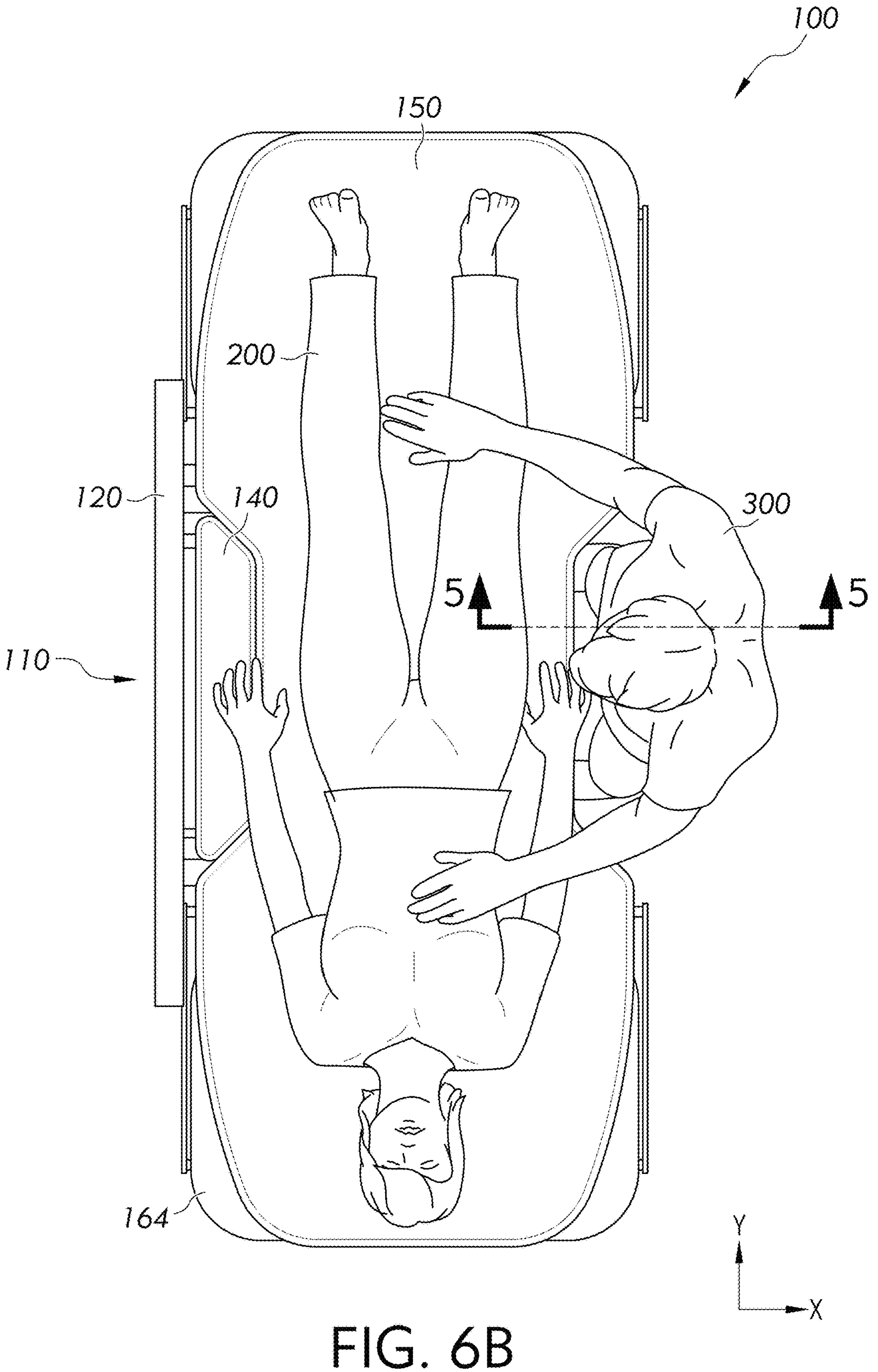
FIG. 6B schematically depicts a top view of an example person-support apparatus having a siderail assembly in an open notch mode on the left side and another siderail assembly in a closed notch mode on the right side, according to one or more embodiments shown and described herein.

Referring to FIGS. 6A and 6B, a front view and a top view of an example person-support apparatus 100 having a siderail assembly on the left side in an open notch mode are depicted. The siderail assembly 110 on the left side of the person-support apparatus 100 is in a lowered position while the siderail assembly 110 on the right side is in a raised position. The drop surface 140 moves beneath the mattress 150 with the siderail assembly 110 and the notch 155 is in an open notch mode. The mattress 150 is wider at its widest portion and around 60 cm than the portion across the bottom 158 of the notch 155. In embodiments, the widest portion of the mattress 150 may be 60 cm, 65 cm, 70 cm, 75 cm, 80 cm, or 90 cm. The portion that crosses the bottom 158 of the notch 155 may be 40 cm, 45 cm, 50 cm, 55 cm, 60 cm, 65 cm, or 70 cm. The depth 157 of the drop surface 140 may be 2 cm, 4 cm, 6 cm, 8 cm, 10 cm, 12 cm, 14 cm, 16 cm, 18 cm, or 20 cm. A subject 200 is laying on the top of the mattress 150 and a person 300, such as a surgeon, leans against the mattress 150 at the bottom 158 (e.g. as illustrated in FIGS. 1 and 2B) of the notch 155 with the thighs of the person 300. The person 300 has a posture with a straight back and elbows at a 90-degree angle. In such a posture, the person 300 may reach the desired body parts of the subject 200 without excessive bending or twisting and keeps the hands in a comfortable position that allows them to control the surgical instruments, medical applications, or the like.

FIG. 7 schematically depicts a back view of an example person-support apparatus 100 having a siderail assembly 110 on the right side in a closed notch mode when the siderail assembly 110 is in a lowered position. As illustrated in FIG. 7, the mattress 150 is supported by a support plate 152 with a support-plate handle 154. The support plate 152 is supported by a support deck 164, which is further supported on the person-support apparatus frame 160. Beneath the support deck 164 and on the upper right side of the person-support apparatus frame 160, two pivot joints 162 may be pivotally coupled to the siderail assembly 110 at the two frame ends 134. The siderail adjustment mechanisms 130 are rotated downwardly and the rail ends 132 are at their lowest position. The rail ends 132 may be pivotally connected to the bottom of the siderail 120. The siderail 120 may be rotated to an upright position with the bottom pivotally coupled to the rail end 132 and the upper portion engaged with frame ends 134 and the pivot joints 162. The person-support apparatus frame 160 may further include a locking mechanism to secure the siderail 120 in the upright position with the top of the siderail 120 at a similar level as the pivot joints 162 and lower than the support deck 164. The locking mechanism may be a padlock, a deadbolt, or a lever lock.

The inner side of the siderail 120 attaches the vertical plane 126 of the drop-surface support frame 124. The drop surface 140 is disengaged with the drop-surface support frame 124. Instead, the top base of the drop surface 140 may be engaged with the mattress 150 at the bottom 158 (e.g. as illustrated in FIGS. 1 and 2B) of the notch 155. The person-support apparatus 100 may further include a bracket attached to a portion of the person-support apparatus frame 160 underneath the mattress. The bracket may slide in a retracted position without engaging or connecting to the drop surface 140 in an open notch mode. The bracket may slide out to an extended position to support the drop surface 140 in a closed notch mode, especially when the drop surface 140 is disengaged with the siderail 120. In some embodiments, the drop-surface support frame 124 may fit into the bracket to create a stable connection to the mattress to hold weight.

The upper surface of the drop surface 140 is at the same level as the mattress 150 and the drop surface 140 may connect the mattress 150 to form a shared planar surface. The drop surface 140 may be positioned within the space of the notch 155 such that the drop surface 140 and the right edge of the mattress 150 are substantially complementary to each other. The notch is in a closed notch mode. There may be a gap between the edge of the mattress 150 and the drop surface 140 while the gap is narrow that no body parts of a subject, such as a finger or a toe, may drop into the gap without first applying a force to enlarge the gap.

In some embodiments, the drop surface 140 may be stowed beneath the person support apparatus. The frame may have a sliding mechanism that allows the drop surface to be stowed and retrieved. The sliding mechanism may include rails or tracks attached to the frame and a sliding platform that holds the drop surface. The frame may further include one or more locking mechanism to ensure the drop surface remain securely in place when stowed.

In some embodiments, the outer side of the siderail 120 may be in the same perpendicular plane as the edge of the mattress at the bottom 158 of the notch 155. In some other embodiments, the outer side of the siderail 120 may be in a retracted position that the outer side of the siderail 120 is closer to the center of the mattress 150 than the vertical plane of the edge of the mattress at the bottom 158 of the notch 155 is. The rail 170 may be in an operable status to attach to other surgical instruments as the siderail adjustment mechanisms 130 are rotated to the lowest position.

Figure 8A:
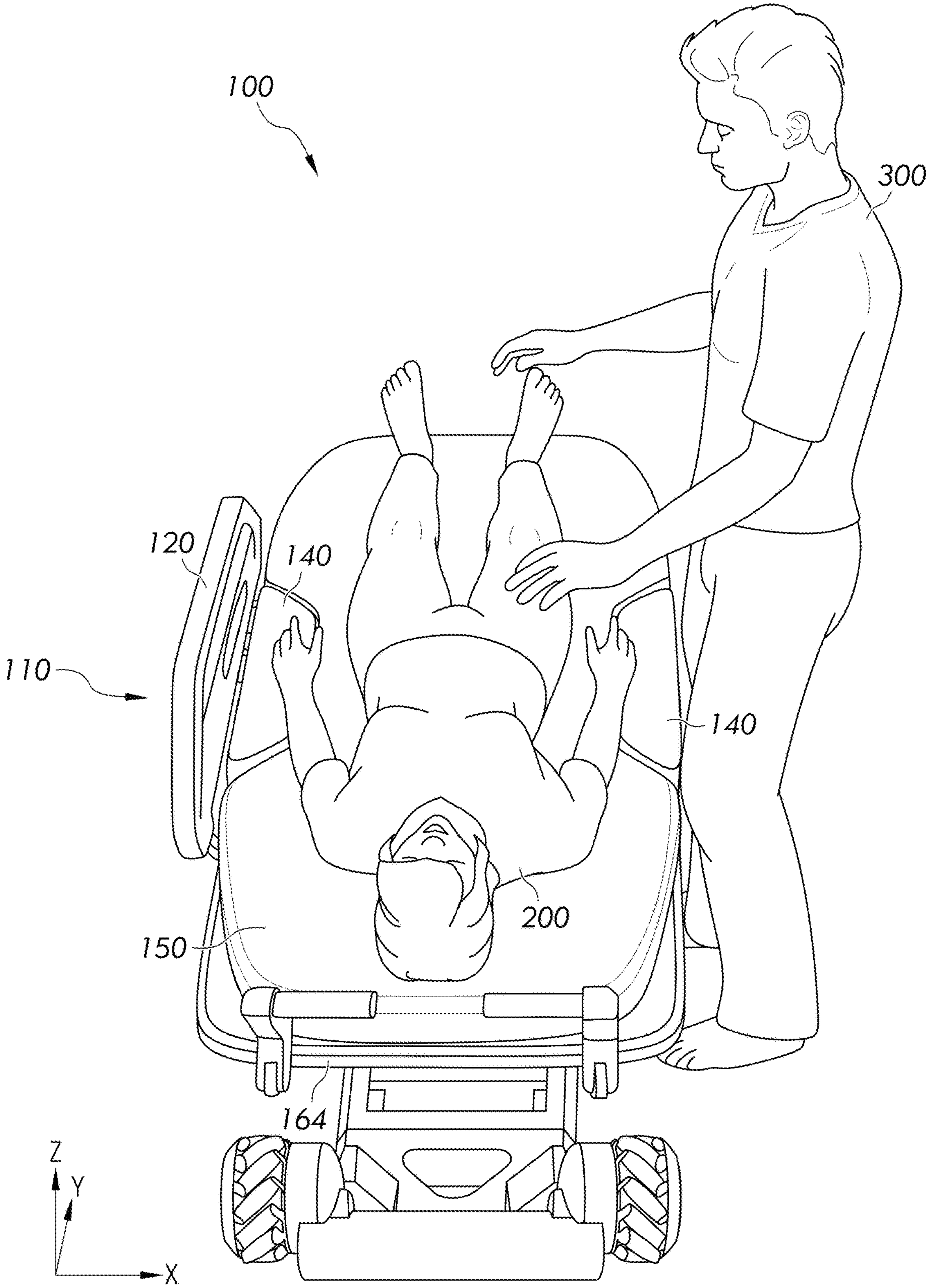
FIG. 8A schematically depicts a front perspective view of an example person-support apparatus having a siderail assembly in a closed notch mode on the left side when the siderail assembly is in a lowered position and another siderail assembly in a closed notch mode on the right side when the another siderail assembly is in a raised position, according to one or more embodiments shown and described herein.
Figure 8B:
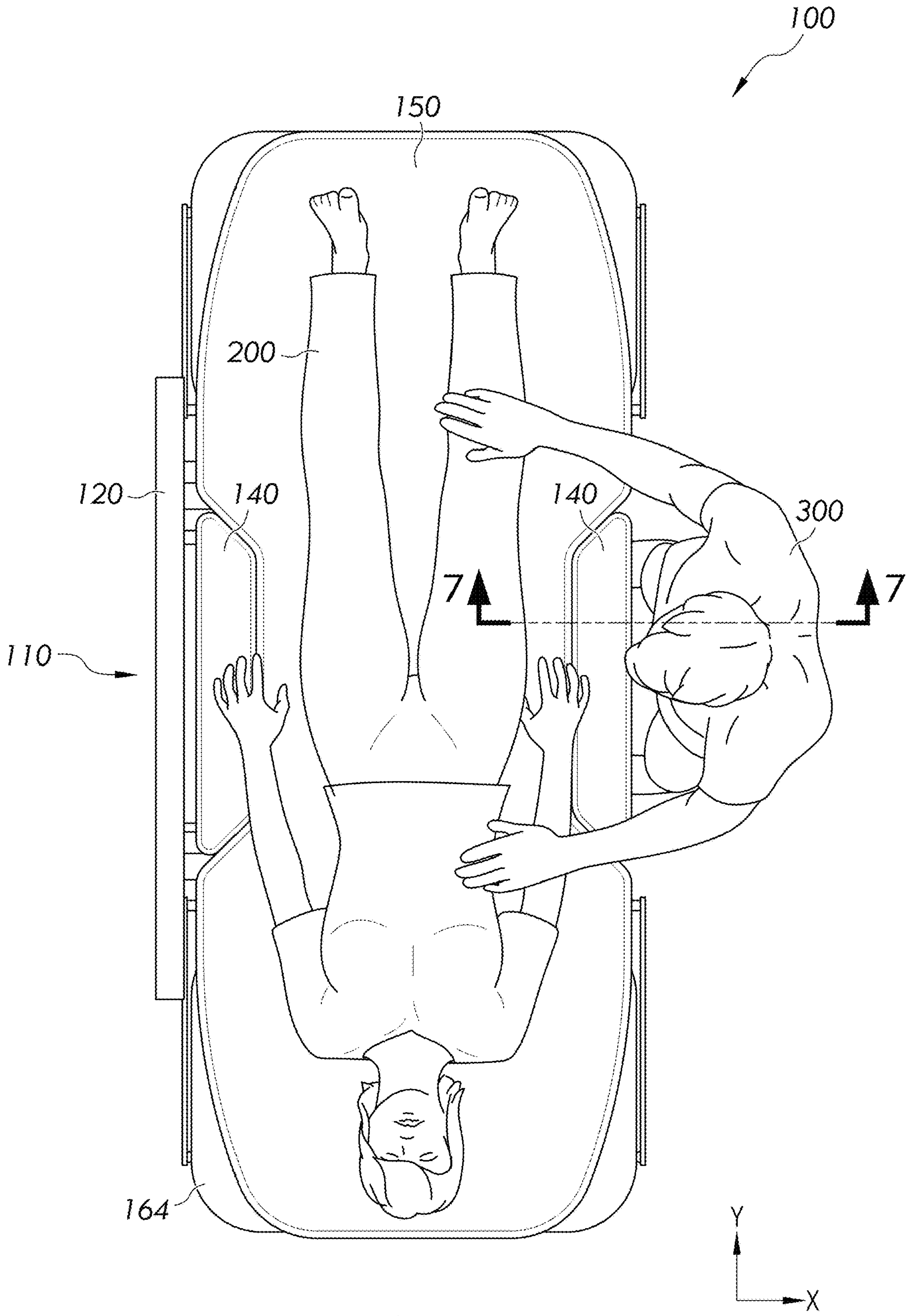
FIG. 8B schematically depicts a top view of an example person-support apparatus having a siderail assembly in a closed notch mode on the left side when the siderail assembly is in a lowered position and another siderail assembly in a closed notch mode on the right side when the another siderail assembly is in a raised position, according to one or more embodiments shown and described herein.

Referring to FIGS. 8A and 8B, a front view and a top view of an example person-support apparatus 100 having a siderail assembly 110 on the left side in a closed notch mode when the siderail assembly 110 on the left side is in a lowered position are depicted. The siderail assembly 110 on the left side of the person-support apparatus 100 is in a lowered position while the siderail assembly 110 on the right side is in a raised position. The drop surface 140 does not move beneath the mattress 150 with the siderail 120. Instead, the drop surface 140 is engaged with the mattress 150 at the bottom 158 of the notch 155 to occupy the space of the notch 155. The notch 155 is in a closed notch mode. The width at its widest portion of the mattress 150 is comparable to the portion across the bottom 158 of the notch 155. In embodiments, the widest portion of the mattress 150 may be 60 cm, 65 cm, 70 cm, 75 cm, 80 cm, or 90 cm. The portion that crosses the bottom 158 of the notch 155 may be 60 cm, 65 cm, 70 cm, 75 cm, 80 cm, or 90 cm. A subject 200 is laying on the top of the mattress 150 and a person 300, such as a surgeon, leans against the mattress 150 at the width 156 (e.g. as illustrated in FIGS. 1 and 2B) of the notch 155 with the person's 300 thighs. In such a posture, the person 300 may not reach the desired parts of the subject 200 in a posture with a straight back and elbows at a 90-degree angle. Instead, the person 300 may need to make excessive bending or twisting to reach a desired part of the subject 200 and the hands of the person 300 may not be in a desired position to control the surgical instruments, medical applicants, or the like.

Figure 9:
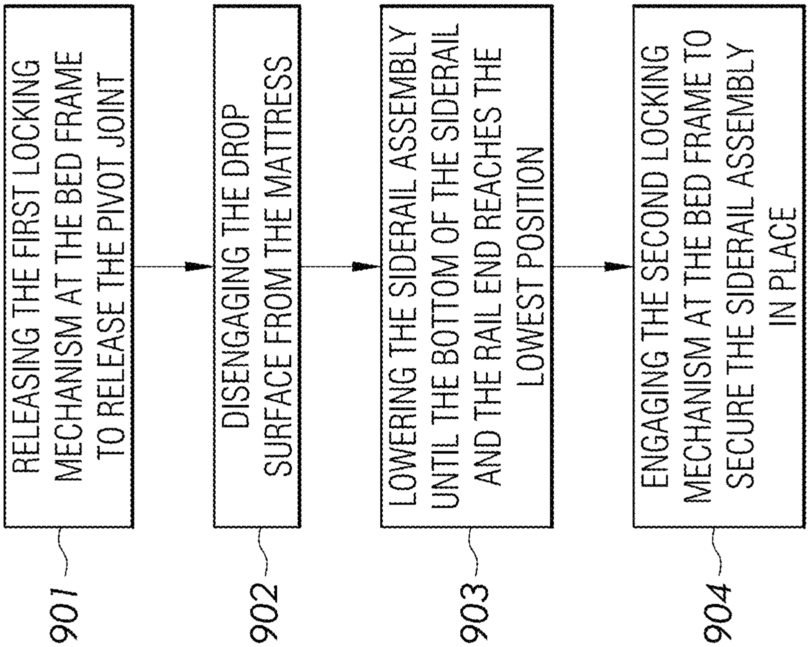
FIG. 9 illustrates a flow diagram of an illustrative method for switching a siderail assembly from a raised position to a lowered position, according to one or more embodiments shown and described herein.

Referring to FIG. 9, an example flow diagram of illustrative steps for switching a siderail assembly from a raised position to a lowered position is illustrated. At block 901, a first locking mechanism at the person-support apparatus frame is released to release the pivot joint. At block 902, the drop surface is disengaged from the mattress. At block 903, the frame end of the siderail adjustment mechanism may rotate around the pivot joint to lower the siderail assembly until the bottom of the siderail and the rail end reach the lowest position. At this point, the siderail is beneath the mattress. The siderail may be kept in an upright position. The outside plane of the siderail is retracted closer to the center of the mattress than the bottom of the notch. At block 904, once the siderail assembly is in the lowered position, a second locking mechanism may be engaged at the person-support apparatus frame to secure the siderail assembly in place without pivotable moving upwardly. However, the pivot joints may be slideably engaged with the person-support apparatus frame along the length direction of the apparatus and the siderail may be slid to move closer to the top or bottom of the apparatus.

Figure 10:
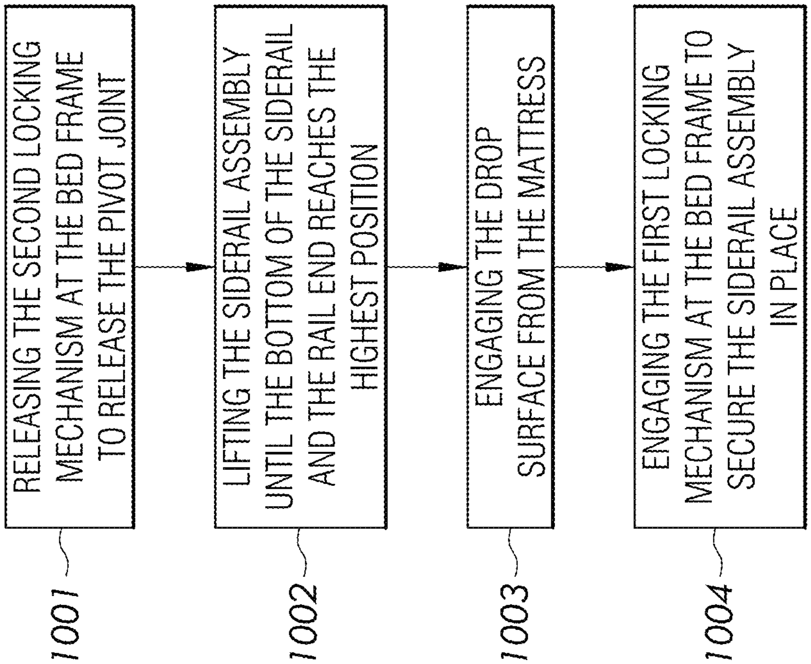
FIG. 10 illustrates a flow diagram of an illustrative method for switching a siderail assembly from a lowered position to a raised position, according to one or more embodiments shown and described herein.

Referring to FIG. 10, an example flow diagram of illustrative steps for switching a siderail assembly from a lowered position to a raised position is illustrated. At block 1001, a second locking mechanism at the person-support apparatus frame is released to release the pivot joint. At block 1002, the frame end of the siderail adjustment mechanism may rotate around the pivot joint to lift the siderail assembly until the bottom of the siderail and the rail end reach the highest position. At this point, the upper portion of the siderail is above the level of the mattress such that a subject on the apparatus may be stopped from falling from the left or right side of the apparatus. The siderail may be kept in an upright position. At block 1003, the drop surface is engaged with the mattress at the bottom of the notch such that a portion of the subject on the apparatus may rest on the drop surface and is therefore supported by the drop surface. At block 1004, once the siderail assembly is in the raised position, the first locking mechanism may be engaged at the person-support apparatus frame to secure the siderail assembly in place without pivotable moving downwardly. However, the pivot joints may be slideably engaged with the person-support apparatus frame along the length direction of the apparatus and the siderail may be slid to move closer to the top or bottom of the apparatus.

It should now be understood that embodiments described herein are directed to person-support apparatus with adjustable width surfaces. The person-support apparatus described herein may include a mattress, a person-support apparatus frame, and a siderail assembly. The mattress may include a notch located at or near the center of the length of the mattress. The notch may have a bottom and defines a depth, a bottom length, and a width. The person-support apparatus frame may support the mattress thereon. The siderail assembly may be pivotally coupled to the person-support apparatus frame through a pivot joint beneath the mattress. The siderail assembly includes a siderail, a drop surface, and a siderail adjustment mechanism. The drop surface is removably attached to the siderail and may have a shape that is substantially complementary to the shape of the notch. The siderail adjustment mechanism includes a rail end and a frame end. The rail end may be pivotally coupled to the siderail. The frame end may be pivotally coupled to the person-support apparatus frame at the pivot joint. The siderail adjustment mechanism may be pivoted upwardly or downwardly at the frame end to move between a raised position and a lowered position. At the raised position, the drop surface may engage with the mattress and occupy the space of the notch and the siderail to protect a subject laying on the apparatus from failing. At the lowered position, the drop surface may either still engage with the mattress and occupy the space of the notch or deploy with the siderail to move underneath the mattress. When the drop surface moves with the siderail assembly to the lowered position, the width of the surface of the mattress around the center is reduced by the depth of the notch.

Overall, the advantage of a person-support apparatus that includes a person-support apparatus frame, a siderail assembly, and a person-support apparatus frame is that it provides an adjustable width surface by simply rotating the siderail assembly upward or downward. When the siderail assembly is in the raised position, the drop surface completes the shape of the mattress and provides desired support to any subject laying hereon. When the assembly is in the lowered position, the siderail and the drop surface move beneath the mattress. This allows a standing or sitting person to lean against the mattress in the notch area. The standing or sitting person can then reach the substantially entire mattress or the area to conduct medical activities on a subject laying on the apparatus, up to the extent of the reach of the standing or sitting person.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

Further aspects of the embodiments described herein are provided by the subject matter of the following clauses:

A siderail assembly, comprising a siderail, a drop surface, and a siderail adjustment mechanism having a rail end and a frame end, wherein: the drop surface is removably attached to the siderail, where the drop surface has a shape that is substantially complementary to a shape of a notch located at or near a center of a length of a mattress; the rail end is pivotally coupled to the siderail; and the frame end is pivotable relative to a person-support apparatus frame such that pivoting the siderail adjustment mechanism upwardly or downwardly switches the siderail assembly between a raised position and a lowered position.

The siderail assembly according to any previous clause, wherein the drop surface engages the mattress, when the siderail assembly is in the raised position.

The siderail assembly according to any previous clause, wherein the drop surface is operatively disengaged from the mattress, or is operatively disengaged from the siderail and is operatively engaged with the mattress when the siderail assembly is in the lowered position.

The siderail assembly according to any previous clause, wherein the siderail assembly further comprises an attachment, wherein the drop surface is removably coupled to the siderail via the attachment.

The siderail assembly according to any previous clause, wherein the attachment is a bolt, a clamp, or a bracket.

The siderail assembly according to any previous clause, wherein the siderail assembly further comprises a drop-surface support frame comprising a vertical plane and a horizontal plane, wherein the vertical plane is coupled to the siderail.

The siderail assembly according to any previous clause, wherein the drop surface is removably attached to the horizontal plane of the drop surface such that the horizontal plane supports the drop surface.

The siderail assembly according to any previous clause, wherein the frame end of the siderail adjustment mechanism is pivotally coupled to the person-support apparatus frame through a pivot joint attached to the person-support apparatus frame.

The siderail assembly according to any previous clause, wherein the drop surface is further configured to be stowed beneath the person-support apparatus.

A person-support apparatus comprising: a mattress comprising a notch located at or near a center of a length of the mattress, wherein the notch comprises a bottom; a person-support apparatus frame supporting the mattress thereon; and a siderail assembly pivotally coupled to the person-support apparatus frame, the siderail assembly comprising a siderail, a drop surface, and a siderail adjustment mechanism, wherein: the drop surface is removably attached to the siderail, where the drop surface has a shape that is substantially complementary to the shape of the notch; the siderail adjustment mechanism comprises a rail end pivotally coupled to the siderail and a frame end pivotally coupled to the person-support apparatus frame such that pivoting the siderail adjustment mechanism upwardly or downwardly switches the siderail assembly between a raised position and a lowered position.

The person-support apparatus according to any previous clause, wherein the frame end of the siderail adjustment mechanism is pivotally coupled to the person-support apparatus frame through a pivot joint attached to the person-support apparatus frame.

The person-support apparatus according to any previous clause, wherein the pivot joint is slidably attached to a siderail track along a length direction of the person-support apparatus.

The person-support apparatus according to any previous clause, wherein the person-support apparatus frame further comprises a first locking mechanism and a second locking mechanism, wherein the siderail is secured by the first locking mechanism in the lowered position, and the siderail is secured by the second locking mechanism in the raised position.

The person-support apparatus according to any previous clause, wherein the siderail assembly further comprises an attachment, wherein the drop surface is removably coupled to the siderail via the attachment.

The person-support apparatus according to any previous clause, wherein the attachment is a bolt, a clamp, or a bracket.

The person-support apparatus according to any previous clause, wherein the siderail assembly further comprises a drop-surface support frame comprising a vertical plane and a horizontal plane, wherein the attachment is coupled to the vertical plane.

The person-support apparatus according to any previous clause, wherein the drop surface is removably attached to the horizontal plane of the drop surface such that the horizontal planet supports the drop surface.

The person-support apparatus according to any previous clause, wherein the notch is an open notch when the drop surface is coupled to the siderail assembly in the lowered position.

The person-support apparatus according to any previous clause, wherein the open notch operably accommodates a standing person to lean against the bottom of the notch.

The person-support apparatus according to any previous clause, wherein the bottom of the notch is wider than a buttock portion, a waist portion, or a thigh portion of the standing person.

The person-support apparatus according to any previous clause, wherein the bottom of the notch is narrower than a width of the notch.

The person-support apparatus according to any previous clause, wherein the notch is a closed notch when the siderail assembly is in the raised position or the drop surface is removably coupled to the mattress.

The person-support apparatus according to any previous clause, wherein the drop surface connects the mattress to form a shared planar surface.

The person-support apparatus according to any previous clause, wherein the person-support apparatus further comprises a bracket and a drop-surface support frame, wherein the bracket and the drop-surface support frame connects the drop surface to the mattress.

The person-support apparatus according to any previous clause, wherein the drop-surface support frame fits into the bracket to create a stable connection that can hold weight.

The person-support apparatus according to any previous clause, wherein the bracket attaches to a portion of the person-support apparatus frame underneath the mattress.

The person-support apparatus according to any previous clause, wherein the notch of the mattress is a V notch, a U notch, a trapezoidal notch, or a compound notch.

The person-support apparatus according to any previous clause, wherein the person-support apparatus further comprises a rail at the bottom of the notch.

The person-support apparatus according to any previous clause, wherein the rail is in an operable status when the siderail assembly is in the lowered position.

The person-support apparatus according to any previous clause, wherein the person-support apparatus further comprises a support deck on the person-support apparatus frame, wherein the support deck is supported by the person-support apparatus frame.

The person-support apparatus according to any previous clause, wherein the person-support apparatus further comprises a support plate removably engaged between the mattress and the support deck.

The person-support apparatus according to any previous clause, wherein the support plate comprises a plurality of handles such that the support plate with the mattress thereon is operable to be lifted and removed from the person-support apparatus.

The person-support apparatus of any previous clause, wherein the drop surface is further configured to be stowed beneath the person-support apparatus.

A person-support apparatus comprising: a frame; a deck supported by the frame and configured to support a person lying on a mattress on the deck; and a siderail positioned at the side of the deck; a siderail adjustment mechanism configured to move the siderail upwardly and downwardly relative to the deck; and wherein the deck comprises a drop section adjacent the siderail and configured to be raised or lowered relative to the remainder of the deck, so as to widen or narrow the width of the deck section, such that the remainder of the deck is configured to support a person and the drop section to no longer support a person.

The person-support apparatus according to any previous clause, wherein the drop surface is further configured to be stowed beneath the person-support apparatus.

The person-support apparatus according to any previous clause, wherein the frame end of the siderail adjustment mechanism is pivotally coupled to the person-support apparatus frame through a pivot joint attached to the person-support apparatus frame.

The person-support apparatus according to any previous clause, wherein the person-support apparatus further comprises a support deck on the person-support apparatus frame, wherein the support deck is supported by the person-support apparatus frame.

The person-support apparatus according to any previous clause, wherein the person-support apparatus further comprises a support plate removably engaged between the mattress and the support deck.

The person-support apparatus according to any previous clause, wherein the support plate comprises a plurality of handles such that the support plate with the mattress thereon is operable to be lifted and removed from the person-support apparatus.

It will be apparent to those skilled in the art that various modifications and variations can be made to the embodiments described herein without departing from the scope of the claimed subject matter. Thus, it is intended that the specification cover the modifications and variations of the various embodiments described herein provided such modification and variations come within the scope of the appended claims and their equivalents.

What is claimed is:

1. A siderail assembly, comprising:

a siderail;

a drop surface configured to be raised or lowered relative to a support deck of a person-support apparatus supporting a mattress thereon, the drop surface shaped, sized, and located to correspond with a notch defined along a length of the mattress, the notch having a bottom and a width, the bottom being narrower than the width;

a siderail adjustment mechanism having a rail end and a frame end; and wherein:

the drop surface is removably attached to the siderail;

the rail end of the siderail adjustment mechanism is pivotally coupled to the siderail;

the frame end of the siderail adjustment mechanism is pivotable relative to a person-support apparatus frame such that pivoting the siderail adjustment mechanism moves the siderail assembly between a raised position and a lowered position; and when the siderail assembly is in the raised position, the drop surface fits within the notch to fill an empty space of the notch that is present when the siderail assembly is in the lowered position.

2. The siderail assembly of claim 1, wherein:

the drop surface operably engages a mattress of the person-support apparatus, when the siderail assembly is in the raised position; and the drop surface is operatively disengaged from the mattress, when the siderail assembly is in the lowered position, or is operatively disengaged from the siderail and is operatively engaged with the mattress when the siderail assembly is in the lowered position.

3. The siderail assembly of claim 1, wherein the siderail assembly further comprises an attachment, wherein the drop surface is removably coupled to the siderail via the attachment.

4. The siderail assembly of claim 1, the siderail assembly further comprising a drop-surface support frame comprising a vertical plane and a horizontal plane, wherein the vertical plane is coupled to the siderail, wherein the drop surface is removably attached to the horizontal plane of the drop-surface support frame such that the horizontal plane supports the drop surface.

5. The siderail assembly of claim 1, wherein the drop surface is further configured to be stowed beneath the person-support apparatus.

6. A person-support apparatus, comprising:

a mattress defining a notch along a length of the mattress, wherein the notch comprises a bottom and a width, the bottom is narrower than the width;

a person-support apparatus frame supporting the mattress thereon; and a siderail assembly pivotally coupled to the person-support apparatus frame, the siderail assembly comprising:

a siderail;

a drop surface configured to be raised and lowered relative to a support deck of the person-support apparatus so as to widen or narrow a width of the support deck;

a siderail adjustment mechanism having a rail end and a frame end; and wherein:

the drop surface is removably attached to the siderail;

the rail end of the siderail adjustment mechanism is pivotally coupled to the siderail;

the frame end of the siderail adjustment mechanism is pivotable relative to the person-support apparatus frame such that pivoting the siderail adjustment mechanism moves the siderail assembly between a raised position and a lowered position; and when the siderail assembly is in the raised position, the drop surface fits within the notch to fill an empty space of the notch that is present when the siderail assembly is in the lowered position.

7. The person-support apparatus of claim 6, wherein the frame end of the siderail adjustment mechanism is pivotally coupled to the person-support apparatus frame through a pivot joint attached to the person-support apparatus frame, wherein the pivot joint is slidably attached to a siderail track along a length direction of the person-support apparatus.

8. The person-support apparatus of claim 6, wherein the person-support apparatus frame further comprises a first locking mechanism and a second locking mechanism, wherein the siderail is secured by the first locking mechanism in the lowered position, and the siderail is secured by the second locking mechanism in the raised position.

9. The person-support apparatus of claim 6, wherein the siderail assembly further comprises an attachment, wherein the drop surface is removably coupled to the siderail via the attachment.

10. The person-support apparatus of claim 9, the siderail assembly further comprising a drop-surface support frame comprising a vertical plane and a horizontal plane, wherein:

the attachment is coupled to the vertical plane; and the drop surface is removably attached to the horizontal plane of the drop surface such that the horizontal plane supports the drop surface.

11. The person-support apparatus of claim 6, wherein the notch is a closed notch when the siderail assembly is in the raised position or the drop surface is removably coupled to the mattress.

12. The person-support apparatus of claim 11, the person-support apparatus further comprising a bracket and a drop-surface support frame, wherein:

the bracket and the drop-surface support frame connects the drop surface to the mattress; and the bracket attaches to a portion of the person-support apparatus frame underneath the mattress.

13. The person-support apparatus of claim 6, wherein the notch of the mattress is a V notch, a U notch, a trapezoidal notch, or a compound notch.

14. The person-support apparatus of claim 6, the person-support apparatus further comprises a rail at the bottom of the notch, wherein the rail is in an operable status when the siderail assembly is in the lowered position.

15. The person-support apparatus of claim 6, the person-support apparatus further comprising a support deck on the person-support apparatus frame and a support plate removably engaged between the mattress and the support deck, wherein:

the support deck is supported by the person-support apparatus frame; and the support plate comprises a plurality of handles such that the support plate with the mattress thereon is operable to be lifted and removed from the person-support apparatus.

16. The person-support apparatus of claim 6, wherein the drop surface is further configured to be stowed beneath the person-support apparatus.

17. A person-support apparatus comprising:

a frame;

a deck supported by the frame and configured to support a person lying on a mattress on the deck, the mattress defining a notch along a length of the mattress, wherein the notch comprises a bottom and a width, the bottom is narrower than the width;

a siderail positioned at the side of the deck;

a siderail adjustment mechanism configured to move the siderail upwardly and downwardly relative to the deck; and wherein:

the deck comprises a drop section adjacent the siderail and configured to be raised or lowered relative to remainder of the deck, so as to widen or narrow a width of the deck, such that the remainder of the deck is configured to support the person and the drop section to no longer support the person; and when the siderail assembly is in the raised position, the drop section fits within the notch to fill an empty space of the notch that is present when the siderail assembly is in the lowered position.

18. The person-support apparatus of claim 17, wherein:

the drop section is further configured to be stowed beneath the person-support apparatus; and the siderail adjustment mechanism is pivotally coupled to the frame through a pivot joint attached to the frame.

19. The person-support apparatus of claim 17, the person-support apparatus further comprises a support plate removably engaged between the mattress and the deck, wherein:

the support plate comprises a plurality of handles such that the support plate with the mattress thereon is operable to be lifted and removed from the person-support apparatus.

* * * * *